United States Patent [19]

Toshimitsu

[11] Patent Number: 4,583,015
[45] Date of Patent: Apr. 15, 1986

[54] SINGLE-PHASE BRUSHLESS MOTOR WITH MULTISECTOR STATOR ARMATURE POLES HAVING DIFFERENT CROSS-SECTIONS

[75] Inventor: Manabu Toshimitsu, Saitama, Japan

[73] Assignee: Pioneer Electronic Corporation, Tokyo, Japan

[21] Appl. No.: 630,803

[22] Filed: Jul. 13, 1984

[30] Foreign Application Priority Data

Aug. 20, 1983 [JP] Japan .................. 58-152231
Dec. 16, 1983 [JP] Japan .................. 58-238591

[51] Int. Cl.$^4$ ............................................. H02K 17/10
[52] U.S. Cl. .................. 310/187; 310/254; 310/269
[58] Field of Search .......... 310/67, 156, 254, 163, 310/187, 216, 269, 68 R

[56] References Cited

U.S. PATENT DOCUMENTS

| | | | |
|---|---|---|---|
| 1,112,833 | 10/1914 | Poole | 310/190 |
| 1,823,979 | 9/1931 | Jordan | 310/187 |
| 2,815,460 | 12/1957 | Jones et al. | 310/190 |
| 3,296,472 | 1/1967 | Fisher | 310/187 |
| 3,634,707 | 1/1972 | Tillner | 310/269 |
| 4,132,932 | 1/1979 | Wanlass | 310/192 |
| 4,438,362 | 3/1984 | Brown | 310/152 |
| 4,499,407 | 2/1985 | Macleod | 310/254 |

Primary Examiner—Patrick R. Salce
Assistant Examiner—D. L. Rebsch
Attorney, Agent, or Firm—Sughrue, Mion, Zinn, Macpeak and Seas

[57] ABSTRACT

A single-phase brushless motor which can be manufactured at low cost and which can be started at any rotary position. The motor includes a rotary magnet having a plurality of magnetic poles and a stator armature having a plurality of poles, each of which is wound with a coil carrying a driving current. Each of the poles is divided circumferentially into at least two sectors, the cross sections of which at points where the magnetic flux density is a maximum being different from one another. A single position detector detects the rotary position of the rotary magnet relative to the stator armature, and the driving currents in each of the coils are controlled in accordance with the output of the position detector. In preferred embodiments, the poles have links which join them to a generally cylindrical central core. Holes are formed in at least some of the sectors of each of the poles, having different diameters.

10 Claims, 19 Drawing Figures

SINGLE-PHASE BRUSHLESS MOTOR WITH MULTISECTOR STATOR ARMATURE POLES HAVING DIFFERENT CROSS-SECTIONS

BACKGROUND OF THE INVENTION

The present invention relates generally to a single-phase brushless motor, and particularly to such a motor which includes a single position detector for detecting a position of a rotary magnet relative to a stator armature and a device for controlling driving currents in each of the coils of the stator armature in response to the output of the single position detector.

In a motor driven by a single-phase half-wave rectified current produced in response to the output of the single position detector, so-called dead points are present where the electromagnetic driving torque decreases to zero, at rotary angles (electrical angles) of 0° and 180°, as indicated in FIG. 1A, where the motor is incapable of self starting. To obviate this difficulty, a motor construction as shown in FIG. 2 has been employed in which the shape of the outer circumference of a core 3, wound with a coil 2 of the stator armature 1, is formed so that an armature gap 5 between the outer circumference of the core and rotary magnet 4 varies, to thus vary the distribution of the magnetic energy between the centers of the magnetic poles of the magnet 4 and the core, thereby shifting the peak of the magnetic torque curve (b) by 90° relative to the electromagnetic driving torque curve (a), as shown in FIG. 1A. Thus, as seen in FIG. 1B, the driving torque composed of the electromagnetic driving torque (a) and magnetic torque (b) never falls to zero. A motor operating on these principles is disclosed in Japanese Published Patent Application No. 50,411/74.

In the conventional motor as shown above, since the shape of the outer circumference of the core 3 is not completely circular, assembly jigs used for laminating the core, for coating the core with an insulating material and for winding the coil on the core, and a casting mold used for pressing the core must be complex, this results in high manufacturing cost. In addition, since the amount of magnetic energy generated is determined by the shape of the outer circumference of the core, it is necessary to vary the shape of the core to adjust the amount of magnetic energy, making it impossible to use a single core in a wide variety of applications.

Moreover, considering that only the positive part of the magnetic torque is actively used for driving the rotor, since the negative part operates to oppose the rotation of the rotor, because the magnitude of the negative part of the magnetic torque is substantially equal to that of the positive part, as shown in FIG. 1A, large ripples in the output torque occur in the conventional single-phase brushless motor, as shown in FIG. 1B.

SUMMARY OF THE INVENTION

Accordingly, it is an object of the present invention to eliminate the above described difficulties accompanying the conventional single-phase brushless motor and to provide such a motor which is adapted for a variety of uses, can be assembled easily and is less expensive than the conventional motor of the same general type.

Another object of the present invention is to provide a single-phase brushless motor which has only a small amount of ripple in its output torque, by reducing the negative part of the magnetic torque.

The objects mentioned above are achieved by a single-phase brushless motor which includes stator armature poles on which are wound armature coils, wherein each pole is divided into two sectors in the circumferential direction of the armature, and the cross-section of the portions of maximum flux density of each sectors are different.

Objects of the invention are also achieved by a single-phase brushless motor which includes stator armature poles on which are wound armature coils, wherein each pole is divided into at least three sectors along the circumferential direction of the armature, and the cross sections of the portions of maximum flux density of each at least three sectors are different.

BRIEF DESCRIPTION OF THE DRAWINGS

Still other objects and features of the present invention will be apparent from the following description, taken in connection with the accompanying drawings, wherein.

DESCRIPTION OF THE PREFERRED EMBODIMENTS

Figure 3:
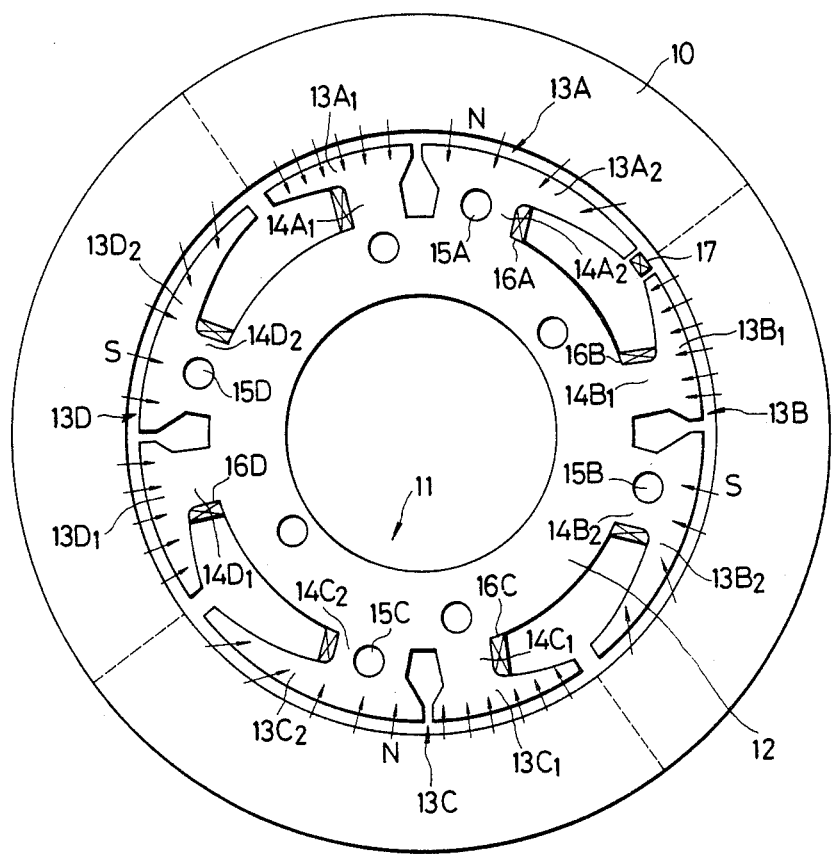
FIG. 3 is a cross-sectional view of a single-phase brushless motor according to a first preferred embodiment of the invention.

FIG. 3 shows a single-phase brushless motor constructed according to a first preferred embodiment of the invention.

Referring to FIG. 3, a rotor in the form of a field magnet 10 is provided with, as an example, four magnet poles. A stator-type armature 11 includes various poles extending radially from a core 12 formed integrally therewith. The armature is provided with, for example, four poles 13A to 13D, each forming the same predetermined gap with the pole faces of the magnet 10. Since the four poles 13A to 13D have the same structure, the following description concerns only the pole 13A.

Figure 1A:
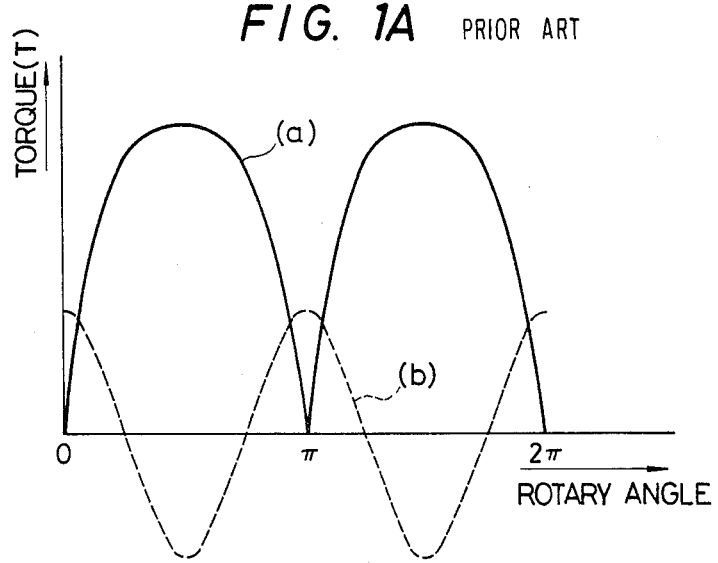
FIGS. 1A and 1B are graphs showing distributions of torques in a conventional single-phase brushless motor.
Figure 1B:
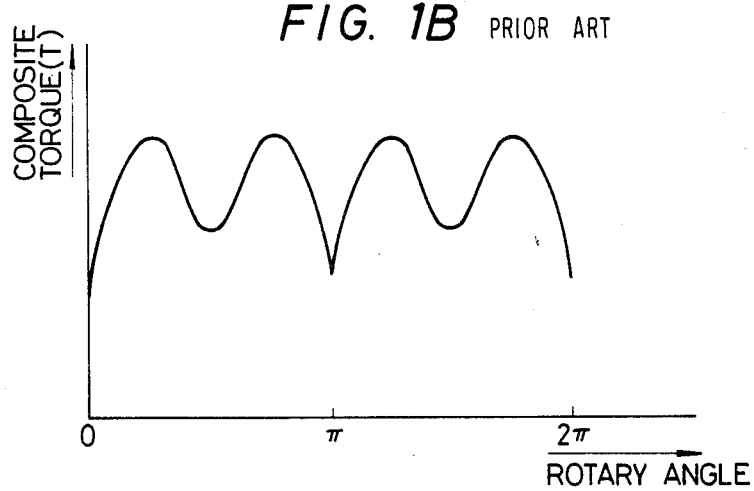
Figure 2:
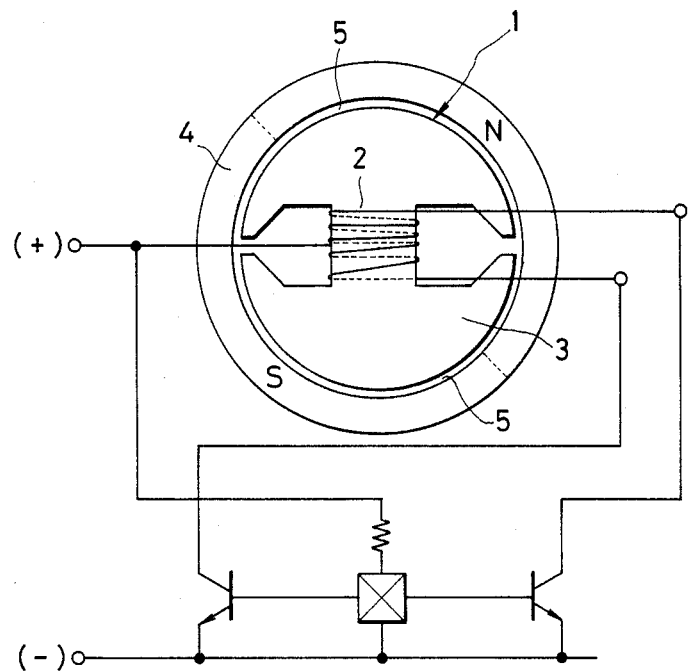
FIG. 2 is a cross-sectional view of a conventional single-phase brushless motor.
Figure 4:
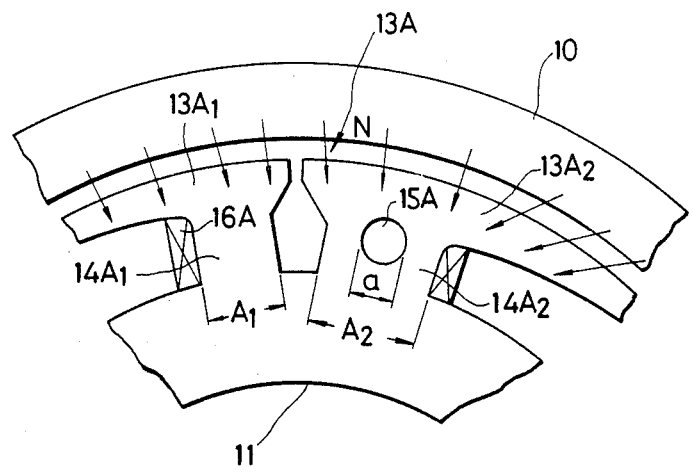
FIG. 4 is an enlarged partially sectional view of a pole 13A of FIG. 3.

As specifically shown in FIG. 4, the pole 13A is divided circumferentially into two sectors $13A_1$ and $13A_2$. The sector $13A_2$ covers a wider angular range than the sector $13A_1$. The adjacent ends of the sectors $13A_1$ and $13A_2$ are connected to the core 12 through links $14A_1$ and $14A_2$, respectively. The links $14A_1$ and $14A_2$ provide magnetic channels through which almost all the flux flowing from magnetic poles of the magnet 10 through the armature gap to pole 13A pass before reaching the core 12. The density of the magnetic flux is greatest at each of these links. A hole 15A is formed at a location generally at the center of the link $14A_2$. Accordingly, the magnetic channel (the area having the maximum magnetic flux density) for the sector $13A_2$ has a smaller cross section than that of the sector $13A_1$. This relation is expressed by:

$$A_1 \cdot t > (A_2 - a)t,$$

where t is the core thickness at the links 14A and $14A_2$, $A_1$ is the width of the link $14A_1$, $A_2$ is the width of the link $14A_2$, and a is the diameter of the hole 15A.

A coil 16A is wound around the links $14A_1$ and $14A_2$. A single position detector, for example, a Hall device, for detecting the position of a rotary magnet 10 relative to the armature 11 may be disposed between any two of the poles 13A to 13D.

The operation of the motor according to the first preferred embodiment of the invention will now be described with particular reference to the pole 13A. When a driving current is passed through the common coil 16A wound around the links $14A_1$ and $14A_2$, either a retractive or repelling force develops between the pole 13A and an opposing magnetic pole on the magnet 10 depending upon the direction in which the current is flowing. This force causes the rotor including the magnet 10 to rotate. Since the link $14A_2$ with a generally central hole 15A has a smaller cross section, and hence a smaller magnetic channel, than the link $14A_1$, the former is magnetically saturated more easily than the latter. In other words, a magnetic flux passes more readily through the sector $13A_1$ than through the sector $13A_2$. Consequently, an uneven distribution of magnetic flux, that is, a magnetic imbalance, results in the pole 13A in its circumferential direction.

As will be apparent for those skilled in the art, the invention provides the same result as with the motor described in Japanese Published Patent Application No. 50,411/74 mentioned above. Advantageously, however, with the invention, various motor torques can be obtained by simply changing the diameter of the holes 15A to 15D. Because the motor torque is proportional to the cross-sectional area of the magnetic channels employed, in the motor of the referenced Japanese Published Patent Application, if the torque must be changed, it is necessary to change, for example, the number of core laminations or the armature gap, which requires replacement of the casting mold. Another advantage of the motor of the invention is the process economy attained due to the complete circularity of the armature core including the poles 13A to 13D.

Figure 5:
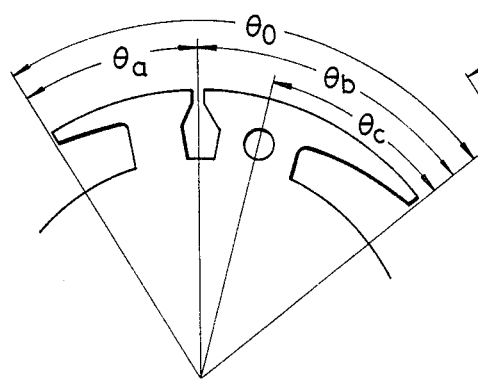
FIGS. 5 and 6 are enlarged partially sectional views corresponding to FIG. 4 wherein two different shapes of armature poles are shown.
Figure 6:
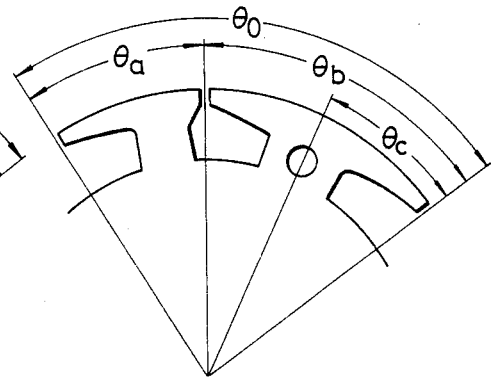
Figure 7A:
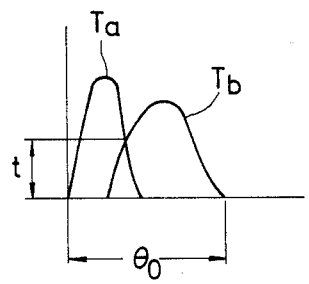
FIGS. 7A and 7B are graphs showing distributions of torques $T_a$ and $T_b$ and a composite torque $T_a+T_b$, respectively, in the armature pole of FIG. 5.
Figure 8A:
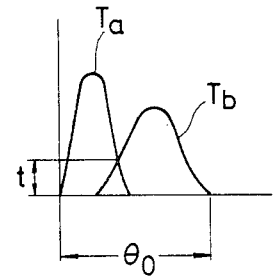
FIGS. 8A and 8B are graphs showing distributions of torques $T_a$ and $T_b$ and a composite torque $T_a+T_b$, respectively, in the armature pole of FIG. 6.
Figure 7B:
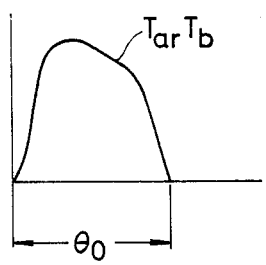
Figure 8B:
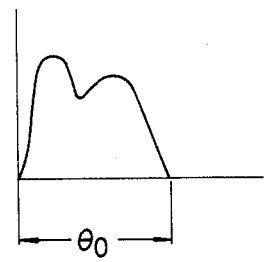

In FIGS. 5 and 6, two different shapes of armature poles 13A are shown in which the angular positions $\theta_c$ of the link $14A_2$ and the angular range $\theta_b$ of the sector $13A_2$ are varied. In the case of FIG. 5, the link $14A_2$ is disposed near the sector $13A_1$. In this case, the torques $T_a$ and $T_b$ at the sectors $13A_1$ and $13A_2$ and the composite torque $(T_a + T_b)$ are shown in the graphs of FIGS. 7A and 7B, respectively. In the case of FIG. 6, the link $14A_2$ is disposed substantially at the center of the sector $13A_2$. In this case, the torques $T_a$ and $T_b$ at the sectors $13A_1$ and $13A_2$ and the composite torque $(T_a + T_b)$ are as shown in FIGS. 8A and 8B, respectively. It can be clearly understood from FIGS. 7A to 8B that the composite torque and the peak values thereof are increased in the case in which the link $14A_2$ is disposed near the sector $13A_1$.

Figure 9:
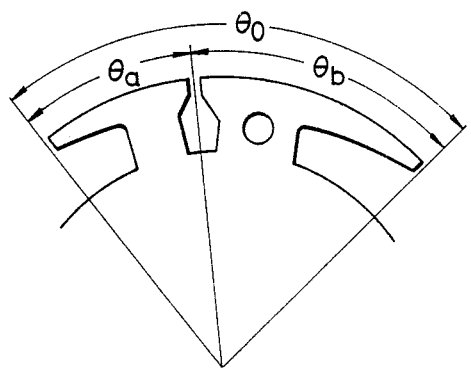
FIGS. 9 and 10 are enlarged partially sectional views corresponding to FIG. 4 wherein two further different shapes of armature poles are shown.
Figure 10:
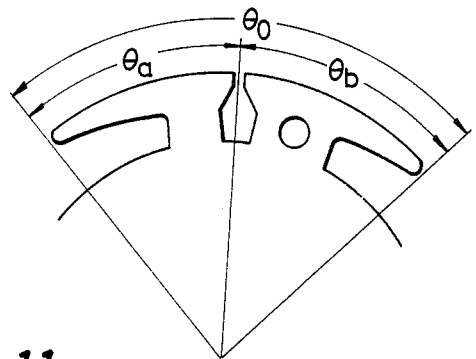
Figure 11:
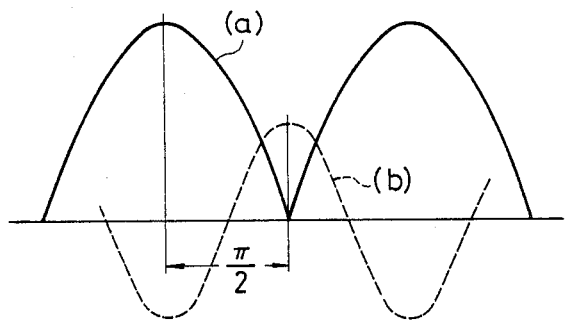
FIGS. 11 and 12 are graphs showing distributions of torques $T_a$, $T_b$ and $T_a+T_b$ in the armature poles of FIG. 9 and 10, respectively.
Figure 12:
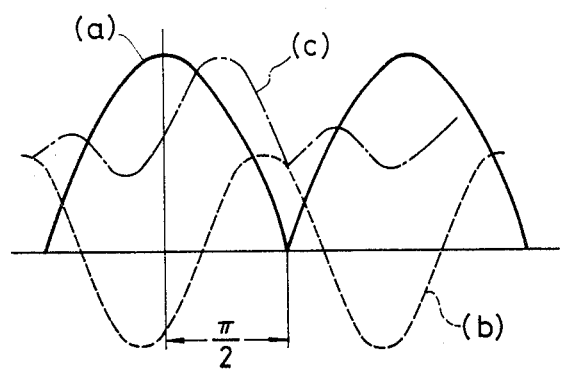

In FIGS. 9 and 10, different shapes of the armature pole 13A are shown in which the angular ranges $\theta_a$ and $\theta_b$ (or circumferential lengths) of the sector $13A_1$ and $13A_2$ are varied. In the case of $\theta_b > \theta_a$ as shown in FIG. 9, the difference in phase between the eletromagnetic driving torque (a) and the magnetic torque (b) is made substantially $\pi/2$ in electrical angle as shown in FIG. 11. On the other hand, in the case of $\theta_a = \theta_b$ as shown in FIG. 10, the difference in phase between the electromagnetic driving torque (a) and the magnetic torque (b) is not $\pi/2$ as shown in FIG. 12. As a result, ripple appears in the composite torque (c) as shown in the figure. According to experimental results, the case in which $\theta_a \cong 29°$ and $\theta_b \cong 61°$ is optimum in that the difference of phase between the electromagnetic driving torque and the magnetic torque is made $\pi/2$.

In the embodiments described above, the hole 15A is formed in the link $14A_2$ in order to make the cross section of the magnetic channel for the sector $13A_2$ smaller than that of the magnetic channel for the sector $13A_1$. The same result can be obtained by making one link narrower than the other link. However, from the viewpint of strength, the provision of the hole 15A is preferred.

Figure 13:
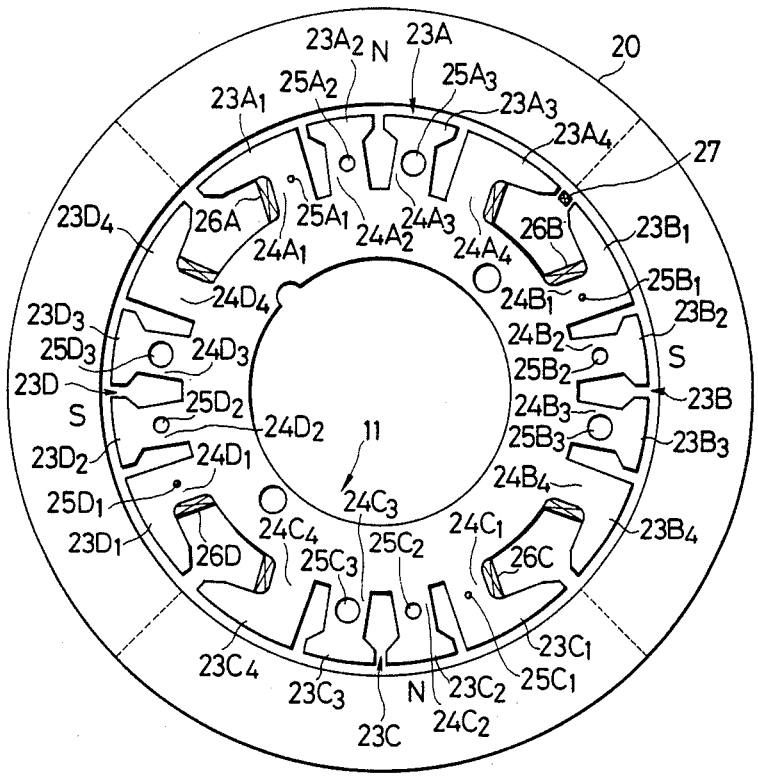
FIG. 13 is a cross-sectional view of a single-phase brushless motor according to a second preferred embodiment of the invention.

A single-phase brushless motor according to a second preferred embodiment of the invention is shown in FIG. 13.

Referring to FIG. 13, a rotor 20 is provided with four magnet poles. A stator-type armature 21 includes various poles extending radially from a core 22 formed integrally therewith. The armature is provided with, for example, four poles 23A to 23D forming a predetermined constant gap with the respective pole faces of the magnet 20. Since the four poles 23A to 23D have the same structure, the following description concerns only the single pole 23A.

Figure 14:
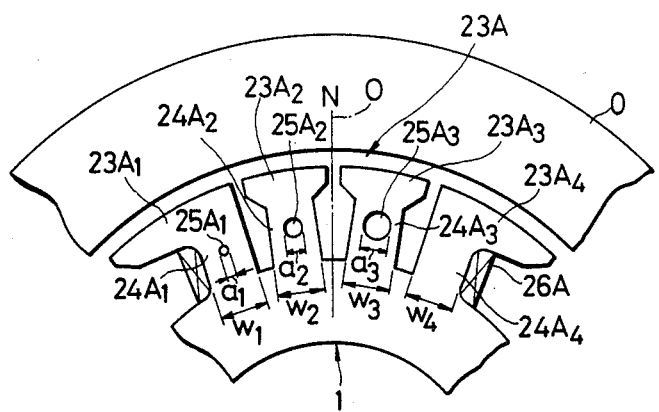
FIG. 14 is an enlarged partially sectional view of an armature pole 23A of FIG. 13.

As is specifically shown in FIG. 14, the pole 23A is divided circumferentially into four sectors $23A_1$, $23A_2$, $23A_3$ and $23A_4$. The sectors $23A_1$ to $23A_4$ have symmetrical positions around the center axis O of the pole 23A. The outer sectors $23A_1$ and $23A_4$ cover wider angular ranges than the inner sectors $23A_2$ and $23A_3$. The respective ends of the sectors $23A_1$ to $23A_4$ are connected to the core 22 through links $24A_1$ to $24A_4$, respectively. The links $24A_1$ to $24A_4$ provide magnetic channels through which almost all the magnetic flux passes into the sectors $23A_1$ to $23A_4$ from the magnetic poles of the magnet 20 through the armature gap. The density of the magnetic flux is greatest at each of these links. Holes $25A_1$, $25A_2$ and $25A_3$ having different diameters are formed at the centers of the links $24A_1$, $24A_2$ and $24A_3$, respectively, so that the corresponding cross sections of the links have different maximum magnetic flux densities.

The cross section of the links $24A_1$ to $24A_2$ are determined, for example, to satisfy the following relation:

$$W_4 \cdot t > (W_1 - a_2)t > (W_2 - a_2)t > (W_3 - a_3)t,$$

where t is the core thickness at the links $24A_1$ to $24A_4$, $W_1$ to $W_4$ are the widths of the links $24A_1$ to $24A_4$, respectively, and $a_1$ to $a_3$ are the diameters of the holes $25A_1$ to $25A_3$, respectively. A cooil 26A is wound around the links $24A_1$ to $24A_4$. A single position detector, for example, a Hall device, for detecting the position of the rotating magnet 20 relative to the armature 21 may be disposed between any two of the poles 23A to 23D.

Figure 15:
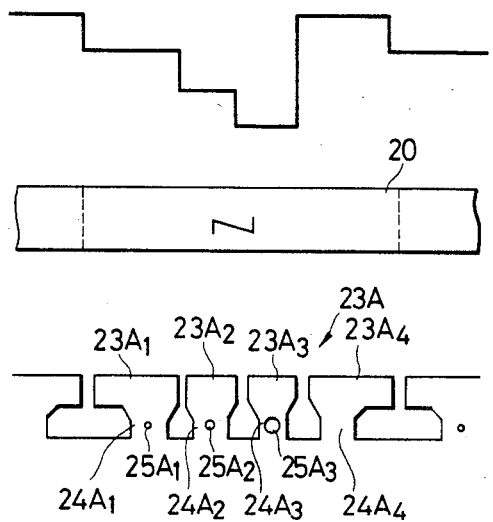
FIG. 15 is a graph showing a nonuniform distribution of a magnetic flux passing through the armature pole 23A of FIG. 14.

The operation of the single-phase brushless motor of the second preferred embodiment of the invention will now be described with particular reference to the pole 23A. When a driving current is passed through the common coil 26A wound around the links $24A_1$ to $24A_4$, either a retractive or repelling force develops between the pole 23A and the opposing magnetic pole of the magnet 20 depending upon the direction in which the current is flowing. This force causes the rotor including the magnet 20 to rotate. Since the cross sections of the links $24A_1$ to $24A_4$ carry different maximum magnetic flux densities due to the presence of the holes $25A_1$ to $25A_3$ having different diameters $a_1$ to $a_3$ ($a_3 > a_2 > a_1$), respectively, the ease of magnetic saturation decreases among the links $24A_3$, $24A_2$, $24A_1$ and $24A_4$ in that order. Consequently, a nonuniform distribution of the magnetic flux, which varies abruptly among the sectors $23A_1$ to $23A_4$, results in the pole 23A in its circumferential direction, as shown at the top of FIG. 15.

Figure 16:
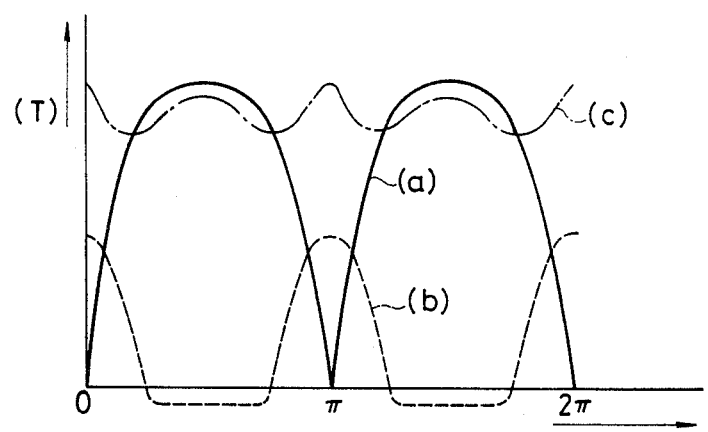
FIG. 16 is a graph showing distributions of torques in the armature pole 23A of FIG. 14.

Accordingly, as shown in FIG. 16, a magnetic torque (b) which has positive peaks at dead points (0° and 180° of the electrical angle) where the electromagnetic driving torque (a) falls to zero is produced. As a result, a driving torque (c) which is composed of the electromagnetic driving torque (a) and the magnetic torque (b) does not fall to zero, as shown in FIG. 16. Accordingly, it can be appreciated that the motor is capable of self-starting from any rotary position. In addition, since the negative part of the magnetic torque is small, the motor has a small amount of ripple in its output torque.

As a further advantage, various motor torques can be obtained by simply changing the diameter of the holes 25A to 25D. Another advantage of the motor of the invention is process economy due to the complete circularity of the armature core including the poles 23A to 25D.

Motor constructions have been described in which each armature pole is divided into four sectors. However, each armature pole may be divided into three, five or any other practical number of sectors. The distribution of the magnetic flux as shown in FIG. 15 becomes more smooth with an increases in the number of divided sectors, resulting in a smaller amount of ripple in the output torque.

According to the present invention, as described above, a single-phase brushless motor is provided in which an armature core has a completely circular shape, resulting in ease in the adjustment of the amount of magnetic energy. This makes the motor easily adaptable for use in various applications and also results in an improvement in the ease of manufacturing, which in turn provides a reduction in manufacturing cost.

In addition, since tightly maintained tolerances are not required with respect to the armature gap between the armature core and rotation magnet rotor, the ease of manufacturing is further improved and thus the cost of the motor further reduced.

Moreover, since the negative part of the magnetic toruqe curve is reduced, the amount of ripple in the torque output is also reduced according to the present invention.

It should be understood that the invention is not limited in its application to the details of construction and arrangement of parts illustrated in the accompanying drawings, since the invention is capable of other embodiments and of being practice or carried out in various ways without departing from the spirit of the invention or the scope of the appended claims.

I claim:

1. A single-phase brushless motor comprising:
   a rotary magnet having a plurality of magnetic poles;
   a stator armature having a plurality of poles on each of which is wound a coil carrying a driving current, each of said poles being divided circumferentially into two sectors each extending over a different angle such that a difference in phase between an electromagnetic driving torque and a driving torque of said motor is substantially $\pi/2$, cross sections of said sectors at which magnetic flux densities therein are maximum being different from one another;
   a position detector for detecting a rotary position of said rotary magnet relative to said stator armature; and
   means for controlling said driving currents in each of said coils in response to an output of said position detector.

2. A single-phase brushless motor comprising:
   a rotary magnet having a plurality of magnetic poles;
   a stator armature having a central, generally cylindrical core, a plurality of poles on each of which is wound a coil carrying a driving current, and a plurality of links, each of said poles being divided circumferentially into two unequal sectors, each of said links joining a respective one of said sectors to said central core, cross sections of said links, where the magnetic flux densities are maximum, being different from one another;
   a position detector for detecting a rotary position of said rotary magnet relative to said stator armature; and
   means for controlling said driving currents in each of said coils in response to an output of said position detector.

3. A single-phase brushless motor comprising:
   a rotary magnet having a plurality of magnetic poles;
   a stator armature having a central, generally cylindrical core, a plurality of poles on each of which is wound a coil carrying a driving current, and a plurality of links, each of said poles being divided circumferentially into at least three unequal sectors, each of said links joining a respective one of said sectors to said central core, cross sections of said links, where the magnetic flux densities are maximum, being different from one another;
   a position detector for detecting a rotary position of said rotary magnet relative to said stator armature; and
   means for controlling said driving currents in each of said coils in response to an output of said position detector.

4. The single-phase brushless motor according to claim 1, wherein said angles over which said two sectors extend are approximately 29° and 61° respectively.

5. The single-phase brushless motor according to claim 1, wherein said stator armature comprises a central generally cylindrical core, said poles, and a plurality of links, each of said links joining a respective one of said sectors to said central core.

6. The single-phase brushless motor according to claim 5, wherein one of said links of each of said poles has a hole therein.

7. A single-phase brushless motor comprising:
   a rotary magnet having a plurality of magnetic poles;
   a stator armature having a plurality of poles on each of which is wound a coil carrying a driving current, each of said poles being divided circumferentially into at least three sectors the angles covered by the outer sectors of said at least three sectors being wider than the angles covered by the inner sectors of said at least three sectors, and cross sections of said sectors at which magnetic flux densities therein are maximum being different from one another;
   a position detector for detecting a rotary position of said rotary magnet relative to said stator armature; and
   means for controlling said driving currents in each of said coils in response to an output of said position detector.

8. The single-phase brushless motor according to claim 7, wherein said angles of said at least three sectors are such that a difference in phase between an electromagnetic driving torque and a magnetic torque is substantially $\pi/2$.

9. The single-phase brushless motor according to claim 7, wherein said stator armature comprises a central generally cylindrical core, said poles, and a plurality of links, each of said links joining a respective one of said sectors to said central core.

10. The single-phase brushless motor according to claim 9, wherein at least two of said links of each of said poles have holes therein, each of said holes of each pole having a different diameter.

* * * * *